United States Patent [19]

Malady et al.

[11] Patent Number: 4,811,247

[45] Date of Patent: Mar. 7, 1989

[54] RANDOM SELECTION SYSTEM

[75] Inventors: John J. Malady, Westwood; Gerard J. Malady, Bergenfield; Marie D. Malady; Marie E. T. Malady, both of Guttenberg, all of N.J.

[73] Assignee: APCO Technical Services, Inc., Palisades Park, N.J.

[21] Appl. No.: 865,130

[22] Filed: May 20, 1986

[51] Int. Cl.$^4$ .......................... G06F 15/46; G06M 7/00

[52] U.S. Cl. .................................... 364/550; 364/468; 364/717; 364/552; 377/6; 340/540

[58] Field of Search ............... 364/178, 468, 478, 550, 364/551, 552, 717, 200; 340/501, 540; 377/6

[56] References Cited

U.S. PATENT DOCUMENTS

| | | | |
|---|---|---|---|
| 3,952,185 | 4/1976 | Stultz et al. | 364/812 |
| 4,109,511 | 8/1978 | Powers, Jr. et al. | 364/554 X |
| 4,139,766 | 2/1979 | Conway | 377/6 |
| 4,281,765 | 8/1981 | Brazell | 209/576 |
| 4,344,146 | 8/1982 | Davis, Jr. et al. | 364/552 X |
| 4,441,196 | 4/1984 | Sanville | 377/9 |
| 4,472,784 | 9/1984 | Blackman | 364/554 |
| 4,535,466 | 8/1985 | Palvolgyi | 364/717 X |
| 4,580,226 | 4/1986 | Bennison | 364/552 X |
| 4,589,081 | 5/1986 | Massa et al. | 340/501 X |
| 4,644,478 | 2/1987 | Stephens et al. | 364/550 |
| 4,652,862 | 3/1987 | Verslycken | 340/540 |

*Primary Examiner*—Parshotam S. Lall
*Assistant Examiner*—Joseph L. Dixon
*Attorney, Agent, or Firm*—Bacon & Thomas

[57] ABSTRACT

A random selection system for making a select/non-select determination for individual events, such as the arrival of a person or an article, is based on the advanced establishment of a predetermined percentage within the system for carrying out the determinations. The system is particularly useful for security monitoring of employees or passengers passing through workplace exits or through terminal entrances, in that each person processed by the system has an identical probability of being selected for further scrutiny. By presetting the percentage of selections to be applied to all events processed, a degree of security desired by the system operators may be achieved. Both methods and apparatus for electronic random selection are taught. A preferred embodiment of the apparatus utilizes LSI digital circuitry for rapidly carrying out each individual select/non-select determination in response to sensing circuitry which detects the arrival of the person or article being processed. The method teaches the electronic presetting of one of a plurality of percentages, within the range of 2.5% to 100% illustratively, which govern the outcome of each individual determination.

2 Claims, 2 Drawing Sheets

RANDOM SELECTION SYSTEM

BACKGROUND OF THE INVENTION

The present invention relates generally to electronic techniques for making random selections, and in particular to a system for making a select or a non-select determination for individual events, such as the arrival of a person or an article, based on the advanced establishment of a predetermined percentage of select outcomes inserted into the system. The system is particularly useful for personnel security or product testing purposes and is readily adapted for the random selection of employees entering or leaving a workplace.

In many activities it is customary to take random samples of articles as they progress through various stages of manufacture for quality control purposes, and a number of statistical techniques have evolved over the years for taking these samples. These techniques range from the very simple to the highly sophisticated It is also known to make more or less random selections of an individual person from a group for various sampling purposes, but these selections often tend to include one or more highly subjective factors. While sound statistical techniques for making valid random selections for most circumstances have been known for many years, their application to the tasks of making truly random selections of people in every day working environments are often less than satisfactory.

The illustrative prior art approaches to making random selections may be found in a number of U.S. patents. U.S. Pat. No. 4,580,226 to Bennison discloses a random sampling system based on a priori knowledge of both the total number of articles in the batch to be sampled, as well as the total number of sample articles to be taken from the batch. A series of random numbers corresponding to the numbers of the particular samples to be taken are derived by a microcomputer, and used to remove the thus selected articles. U.S. Pat. No. 4,321,673 to Hawwass et al discloses the broad concept of using a microcomputer to generate the statistical quantities needed to implement an electronic game based on conventional roulette probabilities. And, U.S. Pat. No. 3,961,169 to Bishop et al discloses electronic circuitry for generating a sequence of binary bits such that a probability that any randomly selected bit will be a "1" is equal to a preselected desired number.

One particular area where a need exists for a fair and impartial selection of individuals for further security scrutiny is that associated with the screening of employees as they exit a workplace. With employee pilferage at record high levels, and the full costs of security systems and personnel rising along with them, it is clear that improved methods and apparatus for providing workplace security are needed.

In the precious metal associated manufacturing industry, for example, walk-through metal detectors are used for loss prevention. However, due to the small size of some of the items which are to be detected, and to certain uncontrollable conditions such as personal articles and clothing carried by the employees, the detection process becomes extremely critical and triggers off many false alarms. Therefore, the use of walk-through metal detectors is only a first stage of detection, and once an alarm is produced a further more precise method of scrutiny is then employed. An objective of the present invention is to select individuals on a purely random basis, such that no one will know in advance who will be selected, and then to subject the selected person to the final, more intensive methods of search.

SUMMARY OF THE INVENTION

It is therefore a primary object of the present invention to provide improved methods and apparatus for making truly random selections of persons and articles.

Another object of the present invention is to provide methods and apparatus for making a select, non-select determination of individual events based on the establishment of a predetermined percentage of select outcomes, regardless of the size of the group from which the selection is made. Thus, a statistically valid selection may be made of any one person, or one article, transitting a sensing location; or an equally valid selection may be made of every one of a succession of individual persons, or articles, transitting the location.

A further object of the present invention is to provide improved apparatus for implementing these random selection methods, which is readily amenable for use in everyday working environments, and which is operable by persons not particularly skilled in the statistical arts.

A still further object of the present invention is to provide improved electronic circuitry for making the desired random selections such that precise and false alarm proof results are consistently achieved.

In a preferred embodiment of the present invention, a digital circuit using commercially available LSI elements is used to implement a system for rapidly carrying out each individual select/non-select determination in response to sensing circuitry which detects the arrival of the person or article being considered. A multistate electronic register is initially preset with pulses such that the percentages of register states containing a pulse corresponds to the desired percentage of select outcomes the system is to make. This presetting is accomplished under the control of the system operators, and the presetting is then locked to prevent the contamination of random selection determinations made thereafter. Upon sensing the occurrence of the event to be considered—person or article in place—a signal is generated which stops the cyclical accessing of each state within the multistate device at the particular state being accessed when the event occurred. If that particular state had been preset as a select state, the system produces an unambiguous indication (red light/alarm condition) so indicating. If the particular state had not been preset as a select state, a second kind of indication (green light/quiescent condition) is produced. Thus, either a select or a non-select determination is fairly and clearly made, and the results of each outcome are quickly and positively indicated.

BRIEF DESCRIPTION OF THE DRAWINGS

Additional objects and advantages of the invention will become apparent to those skilled in the art as the description proceeds with reference to the accompanying drawings wherein.

DETAILED DESCRIPTION OF THE PREFERRED EMBODIMENTS

Figure 1:
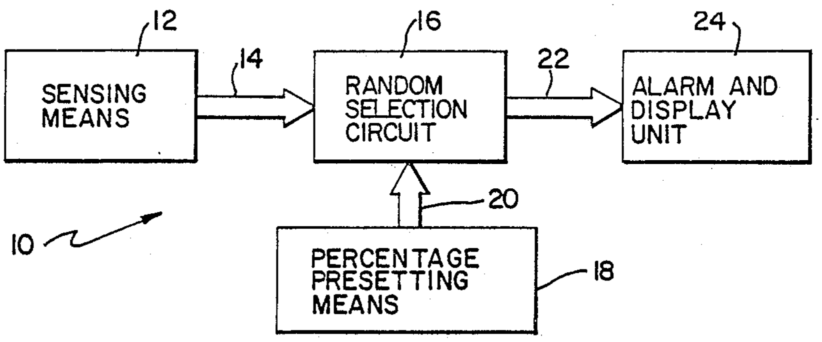
FIG. 1 is a simplified overall block diagram of the random selection system according to the present invention.
Figure 2:
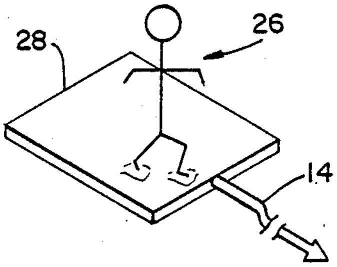
FIG. 2 is a pictorial diagram of a first illustrative sensing means for use with the present invention.
Figure 3:
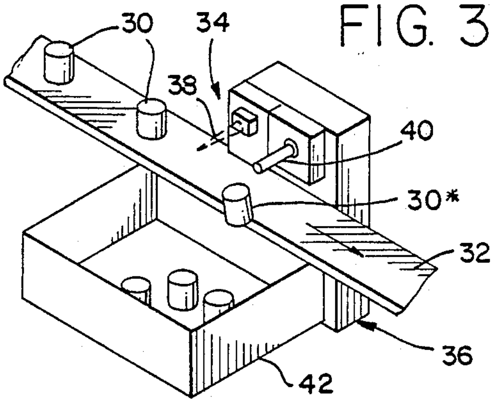
FIG. 3 is a pictorial diagram of a second illustrative sensing means for use with the present invention.

Referring now to FIG. 1, there is shown a simplified block diagram of a preferred embodiment of the random selection system according to the present invention. The overall system 10 comprises sensing means 12 which provides an output on a group of lines 14 to a random selection circuit 16. An additional input to the random selection circuit 16 is provided from a percentage presetting means 18 via a group of lines 20. Outputs from the random selection circuit 16 are routed by a group of lines 22 to an alarm and display unit 24. FIGS. 2 and 3 provide simplified pictorial diagrams of an illustrative few of the various forms the sensing means 12 may take. FIG. 2 shows a system configured to sense the arrival/presence of persons 26 (employees, passengers, or the like) passing through a checkpoint having a floormat 28 to sense each and every transitting person. The floormat 28 may contain one or more pressure sensitive switches, or other detection means, (not shown) which produce suitable output signals which are routed via the lines 14 to subsequent processing circuitry. FIG. 3 shows a system configured to sense the arrival/presence of articles 30 (cans, boxes, and the like) passing along a conveyor 32 by optical sensing means 34 carried on a housing 36. The optical sensing means 34 emits a light beam 38 which detects the arrival of each and every article 30, and uses this information to select individual articles based on some predetermined criteria. Upon completion of a determination specific to each article, by a random selection circuit 16 (not shown) within the housing 36, an article selector 40 may move a particular article 30* to an article holder 42 for further scrutiny.

In use, the random selection system 10 of FIG. 1 may be used with the people sensing arrangement of FIG. 2 to, illustratively, randomly select employees for a closer inspection as they exit the workplace. As the individual employees 26 step on the pressure sensitive floormat 28, the random selection circuit 16 would initiate a determination of whether to select or to not select that particular individual. Using the predetermined probability of selection as previously entered into the circuit 16 by the presetting means 18, each independent event—the arrival/presence or each person—produces an individual electronic determination by the circuit 16. These individual determinations result in one of only two possible outcomes: the first outcome is an alarm condition where the particular transitting person is selected for further scrutiny; the second outcome is a quiescent condition wherein the particular transitting person is not selected, and therefore passes through the checkpoint normally.

Both outcomes are positively indicated by audible, visual, and/or other means to eliminate ambiguity. The below table lists the two outcomes and tabulates several corresponding system indications and features which may, illustratively, be utilized with the system.

TABLE 1

| Person or Item is SELECTED | Person or Item is NOT SELECTED |
|---|---|
| Alarm Condition | Quiescent condition |
| Red lamp lights, buzzer sounds | Green lamp lights |
| Person is selected for further scrutiny | Person is allowed to pass through normally |
| Person/item is physically blocked or moved | Person/item transits normally |

As described below in connection with the detailed discussion of the random selection circuit 16, this random selection of individuals is accomplished on a percentage basis. Should the workplace monitors or management personnel insert a percentage of, say 35% via the presetting means 18, then every employee stepping onto the floormat would have a 35% chance of initiating the alarm (red light) condition. Of course, there also would be a 65% chance of encountering the quiescent (green light) conditions—the purely random selection process making it impossible for anyone, including the monitor/management personnel, to know which transitting person will be selected for further scrutiny.

Figure 4:
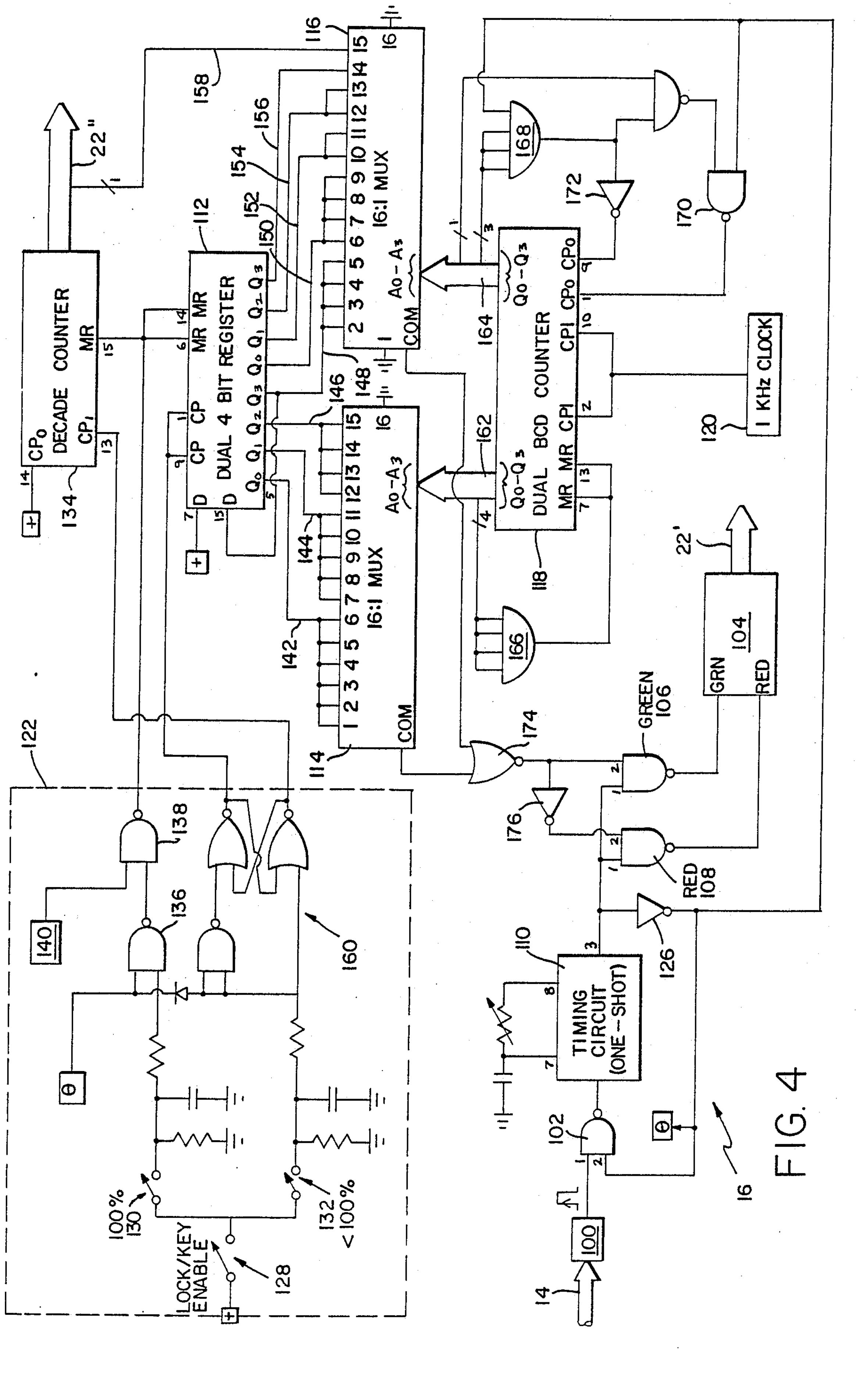
FIG. 4 is a logic diagram of a random selection circuit advantageously used to implement the present invention.

Referring now to FIG. 4, there is shown a logic diagram of a random selection circuit which may advantageously be used to implement the present invention. It will be helpful to also make occasional reference to FIG. 1 as this circuit is described. An input from a sensing means 12 (of FIG. 1) is routed from the lines 14 to a sense signal conditioning circuit 100, whose output is routed to the first input of a nand gate 102. Outputs from the random selection circuit 16 are shown as being routed through an output signal conditioning circuit 104 to the output lines 22' (part of the lines 22 of FIG. 1) for application to an alarm and display unit 24 (also of FIG. 1). For simplicity of exposition, the well-known and minor circuit elements and details—such as suitable power supplies, dropping resistors, filtering capacitors and the like—have been omitted from this diagram. The sense signal conditioning circuit 100 may be considered to use well-known circuitry to apply a single, jitter-free, high logic level pulse corresponding to an actuation of the sensing means 12. The output signal conditioning circuit 104 may also be considered to use well-known circuitry to convert the output logic levels from a nand gate 106 (designated the green gate) and a nand gate 108 (designated the red gate) into control signals suitable to effect the desired indications. Included in these are the selective energizing of lamps, buzzers, relays, solonoids, and the like.

By way of a brief overview, the random selection circuit 16 includes a timing circuit 110 which is triggered by the output of the nand gate 102; a dual 4-bit register 112 into which a preset percentage will be stored; a pair of 16:1 analog multiplexers 114 and 116 which have as their data inputs various combinations of outputs from the dual 4-bit register 112; and a dual BCD counter 118 which accumulates clock pulses from a 1 kHz clock pulse generator 120. The interconnection and functioning of each of these major circuit elements will be fully described in turn. Additionally, candidate commercial type designations for all of these are included along their functional descriptions. As before, the minute details relating to power sources, grounds, enablings, and the like for the various elements have been omitted wherever practical for simplicity of exposition. The interested reader may obtain this level of detail from the device data sheets which are readily available.

The random selection circuit 16 further includes a probability presetting means 122 whose outputs are routed to the clock and master reset inputs of the dual 4-bit register 112, and a decade counter 134. The percentage presetting means 122 may be considered as corresponding substantially to the percentage presetting means 18 discussed in connection with FIG. 1.

Figure 5:
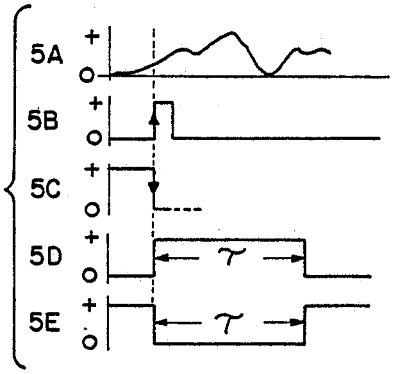
FIG. 5 includes the related waveforms shown in FIGS. 5A, 5B, 5C, 5D and 5E.

The timing circuit 110 operates to produce a single output pulse of predetermined duration in response to an input trigger from the sensing means 12. The circuit 110 may be of the kind commercially available as type NE555, and is configured to operate in its monostable mode. With brief additional reference to the waveforms of FIG. 5, there is shown in FIG. 5A the output from the sensing means 12 (illustratively the output from the floor mat 28) as being an ill defined and extended signal which is converted into a single jitter-free positive pulse (of FIG. 5B) at the output of the conditioning circuit 100. With the timing circuit 110 in its standby mode, (i.e., not triggered) its output on pin 3 is at a low logic level, which is converted by an inverter 126 into a high logic level and applied to a first input of the nand gate 102. Thus, on the leading edge of waveform 5B, the output of nand gate 102 transitions to a low logic level (of FIG. 5C) which negative-going edge triggers the timing circuit 110 to put out a positive pulse (of FIG. 5D) for a particular duration T as determined by the values of the passive components connected its timing pins 7. The duration of the output pulse of 5D may be varied to be as short as about one half second, and as long as several seconds. Immediately upon commencement of the positive output pulse on pin 3 of circuit 110, the action of inverter 126 and nand gate 102 preclude further triggering of the circuit 110 for the duration T of its output pulse.

Positive pulse outputs from the timing circuit 110 are further routed from the output pin 3 to first inputs respectively of the green nand gate 106 and the red nand gate 108. Negative pulse outputs (of FIG. 5E) from the inverter 126 are also further routed to inputs of the percentage resetting circuit 122 (via the connections marked as ), as described below.

The percentage presetting means 122 operates to insert the desired predetermined percentage into the random selection circuit 16 in response to manual inputs from three distinct controls. These three controls are a lock/key enable switch 128; a 100% control switch 130; and a less than 100% control switch 132. These controls further insert corresponding logic states into the decade counter 134 whose outputs are routed via the group of lines 22″ to the display portion of the alarm and the display unit 24. Therein, one of ten individual lamps is illuminated to indicate the particular percentage which has been preset into the random selection circuit 16. The decade counter 134 may be of the kind commercially available as type CD4017BC, and has 10 individually decoded outputs. To effect any change in the preset status of the random selection circuit 16, the key enable switch 128 (shown in the open condition) must be closed to apply the [+] voltage to the percentage preset means 122. This key/lock switch may be actuated only under the control of the workplace monitors or managers so as to closely control which personnel may preset the random selection circuit 16. When closed momentarily, the 100% control switch 130 (shown in the open condition) serves to apply a high logic level to the master resets of the dual 4-bit register 112 (on pins 6 and 14) and the decade counter 134 (on pin 15), thereby resetting them to the all outputs high condition. This resetting high logic level is routed through the 100% control switch 130; through a nand gate 136 (which also has applied to it a negative pulse output from the inverter 126 via connection [θ] ); and through a nand gate 138 (which also has applied to it an initializing circuit 140). Upon being reset, outputs of the dual 4-bit register 112, which are all high, are applied to the data inputs of the two 16:1 analog multiplexers 114 and 116 via 8 groups of lines 142–158. In this condition, 100% of the data lines to the multiplexes are "true" (as is customary, the terms "true" and "high logic level" are used synonymously) and every outcome of the random selection circuit 16 would produce the alarm condition upon sensing an input person or article, as described below. The 16:1 analog multiplexers 114 and 116 may be of the kind commercially available as type CD4067BE, and are hereinafter for simplicity referred to as the 16:1 MUX 114 and/or 16:1 MUX 116. Depending on the input addresses applied, they serve to directly couple one and only one of the sixteen inputs to their single common output, their single output being presented on their pins 1. For mere circuit convenience, the line 158 applies its input to the 16:1 MUX 116 from an output of the decade counter 134.

To preset percentages less than 100, the less than 100% control switch 132 (shown in the open condition) is momentarily closed, thereby toggling the cross-coupled nor gate flip-flop 160, whose outputs are applied as clock pulses to the dual 4-bit register 112 (on pins 1 and 9), and to the decade counter 134 (on pin 13). The dual 4-bit register 112 may be of the kind commercially available as type CD4015N, and its two identical 4-stage registers are connected in cascade. Each actuation of the control switch 132 advances the register/counter 112/134 by one count, and in actual use the number of actuations is determined by the preset percentage of selection desired for each sensed event. As successive clock pulses are applied to the register/counter 112/134, progressively fewer of the outputs remain "true", and the data input to the 16:1 MUXs 114/116, in turn, will have correspondingly fewer high logic levels applied to them. Referring to the group of lines 142, it is seen that upon a one clock pulse advance in the dual 4-bit register 112, six data input lines have the "true" levels removed. Reference to the below Table 2 shows the number of actuations of the less than 100% control switch 132 and the corresponding preset percentages and internal circuit conditions resulting.

TABLE 2

| Number of Switch 132 Actuations | Number of "True" Multiplexer Lines Removed | % of "True" Multiplexer Lines Removed | % of "True" Multiplexer Lines Remaining | Circuit Group Line Number |
|---|---|---|---|---|
| 0 | 0 | 0 | 100 | — |
| 1 | 6 | 20.7 | 79.3 | 142 |
| 2 | 11 | 37.9 | 62.1 | 144 |
| 3 | 15 | 51.7 | 48.3 | 146 |
| 4 | 19 | 65.5 | 34.5 | 148 |
| 5 | 23 | 79.3 | 20.7 | 150 |
| 6 | 25 | 86.2 | 13.8 | 152 |
| 7 | 27 | 93.1 | 6.9 | 154 |
| 8 | 28 | 96.6 | 3.4 | 156 |

TABLE 2-continued

| Number of Switch 132 Actuations | Number of "True" Multiplexer Lines Removed | % of "True" Multiplexer Lines Removed | % of "True" Multiplexer Lines Remaining | Circuit Group Line Number |
|---|---|---|---|---|
| 9 | 29 | 100 | 0 | 158 |

While the number of "true" inputs to the 16:1 MUXs 116 is controlled by the output states of the dual 4-bit registers 112, as established by the preset circuit 122, multiplexer addressing is controlled by the output states of the dual BCD counter 118. The dual BCD counter 118 may be of the kind commercially available as type CD4520BM. The BCD counters 118 accumulate 1 kHz clock pulses produced continuously by the clock pulse generator 120, and provide their BCD outputs via a first group of four lines 162 which are applied to the address inputs of the 16:1 MUX 114; and via a second group of four lines 164 which are applied to the address inputs of the 16:1 MUX 116. The two multiplexers have a total input capacity of 32 lines, however as only 29 lines are actually used (per Table 2) the remaining three (on pins 16, 9, and 16) are grounded. And gates 166 and 168 form part of the circuitry which causes the 32>29 operation to be properly made. The dual BCD counter 118 is incremented by negative-going transitions applied to their two enable inputs (on pins 2 and 10), and are enabled by low logic levels applied to their clock inputs (on pins 1 and 9). The enable levels are provided via the aforementioned inverter 126 (whose output waveform is shown in FIG. 5E) as routed through a nand gate 170 to pin 1; and as routed through the and gate 168 and an inverter 172 to pin 9. Under standby conditions, wherein the sensing means 12 has not been actuated, and hence the timer circuit 110 has not been triggered, the output from the inverter 126 is high. This high logic level places low logic levels on pins 1 and 9, enabling the dual BCD counter 118 to increment, which in turn cyclically runs through the input addresses being applied to the 16:1 MUXs 114/116.

The accumulation of clock pulses by the dual BCD counter 118 is instantly stopped—at a time totally random with respect to which address is at that instant being presented to the 16:1 MUXs 112/114—upon the triggering of the timing circuit 110. This is done by the placing of high logic levels on the two clock inputs of dual BCD counter 118, as derived from the inverter 126 and applied as previously detailed. Therefore, for the duration of the waveform T of FIG. 5E, the output of the BCD counter 118 is "frozen" at some particular address. This particular address applied to the 16:1 MUXs 114/116 will serve to pass the output states of the dual 4-bit register 112 (and the one state from the decade counter 134) directly through to the common (single) outputs of the MUXs 114/116 on their pins 1. Both pin 1 outputs from the MUXs 114/116 are applied to a nor gate 174, whose output is applied to a second input of the green nand gate 106; and also applied through an inverter 176 to a second input of the red nand gate 108.

If either of the common (single) outputs of the MUXs 114/116 is "true", an alarm condition as tabulated in Table 1 is initiated as follows. The two high logic levels applied to the red nand gate 108—the first indicating that timing circuit 110 has been triggered; the second indicating that at least one "true" output from the MUXs 114/116 has been passed through by the "frozen" address of the BCD counter 118—cause its output to transition to a low logic level which is converted by the output signal conditioning unit 104 into signals which generate the red light/select/alarm condition. This alarm condition will persist for the duration T of the waveform of FIGS. 5D and 5E produced by the timing circuit 110 (several seconds or less, which may be set by the system's monitor/management operators), and the person or article which cause the system to be triggered may be subjected to additional scrutiny.

If neither of the (common) single outputs of the MUXs 114/116 is "true", a quiescent condition as tabulated in Table 1 is initiated as follows. The output from the nor gate 174 is forced to a high logic level, which is presented to the second input of the green nand gate 106. The first input of the green nand gate 106 also being presented with a high logic level from the output of the timing circuit 110, produces a low logic level at its output. This is passed on to the output signal conditioning circuit 104 where it is converted into signals which generate the green lamp/non-selected /quiescent condition. As before, this quiescent condition would persist for several seconds or less, and the person or article which causes the system to be triggered is allowed to pass through the checkpoint normally.

Figure 6:
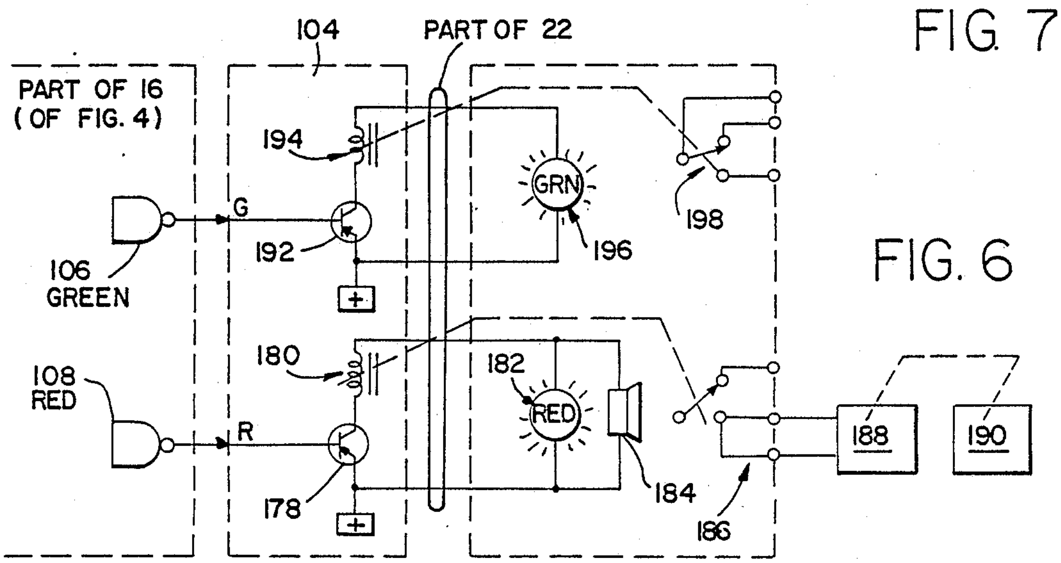
FIG. 6 shows circuitry for actuating the audible and visual alarms, and any mechanical means needed in the random selection system of FIG. 1.

Turning now to FIG. 6, there is shown circuitry for actuating the various visual and audible alarms, as well as for actuating any related mechanical devices required to satisfy the needs of the overall random selection system 10. FIG. 6 should be reviewed in combination with FIG. 4, which provides its input signals, and with FIG. 1 which provides the overall interconnection context of the various portions. A transistor 178 is driven into conduction by a low logic level presented on its base by the random selection circuit 16 for the alarm condition as previously described, thereby energizing a relay 180; a red alarm lamp 182; and a buzzer or horn 184. A plurality of relay contacts 186 (only one SPDT set shown) actuated by the relay 180 may be used to effect further alarms; or by use of additional power sources such as the source 188 to actuate mechanical devices 190 including gate barriers or long-throw solenoids.

A transistor 192 is driven into conduction by a low logic level presented on its base by the random selection circuit 16 for the quiescent condition as previously described, thereby energizing a relay 194 and a green quiescent lamp 196. A plurality of relay contacts 198 (only one SPDT set shown) actuated by the relay 194 may be used to effect further alarms or mechanical movements as indicated above for the alarm condition.

Figure 7:
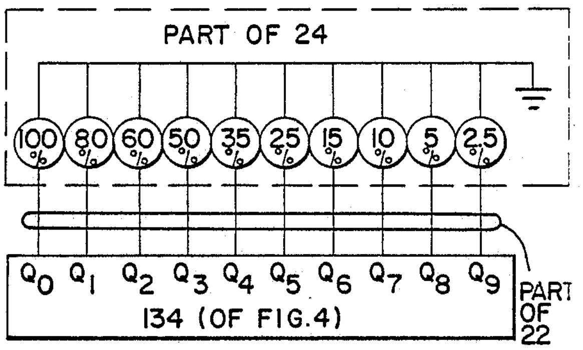
FIG. 7 show an additional portion of the alarm and status display circuitry for use in the random selection system of FIG. 1.

FIG. 7 shows a portion of the alarm and display unit 24 and should also be reviewed in combination with FIG. 4 which provides its input signals, and with FIG. 1 which gives the circuitry its overall context. The state of the decade counter 134 is incremented by the percentage presetting circuit 122, and one (and only one) of its ten outputs is "true" corresponding to the preset percentage loaded into the dual 4-bit register 112—both as previously described. Upon being reset (as previously described) the 100% condition is automatically established in the counter 134, and this is reflected by a high logic level on its $Q_0$ output. Therefore, the 100% lamp will be energized thereby giving a clear indication to the system's monitor/management personnel as to the preset status of the overall system 10. In this case, all (100%) of the individual events sensed will result in the alarm condition and all persons or articles would be selected for further scrutiny. When lesser select percentages are desired, the presetting circuit 122 is used to alter the counter 134 states by one count per actuation. Thus, for one actuation of the presetting circuit 122, the 100% lamp will be extinguished and the $Q_0$ state is emptied, and the 80% lamp will be energized as the $Q_1$ state assumes a "true" output. The remaining lamps—60%, 50%, 35%, 20%, 15%, 5%, 2.5% and 0%—are similarly energized and brief reference to the fourth column of Table 2 shows the corresponding lamp designations for the actual percentages of "true" multiplexer lines remaining.

Although the invention has been described in terms of selected preferred embodiments and various illustrative forms of ancillary elements, the invention should not be deemed limited thereto, since other embodiments and modifications will readily occur to ones skilled in the art. It is therefore to be understood that the appended claims are intended to cover all such modifications as fall within the true spirit and scope of the invention.

What is claimed is:

1. An electronic random selection system for making select/non-select determinations for an individual event based on the establishment of a predetermined percentage of select outcomes for each event, comprising:

(a) a random selection circuit having a multistate electronic device and means for cyclically accessing each one of the states of said multistate device.
  wherein said multistate device comprises a shift register and said means for establishing includes circuits for inserting one or more pulses into said device whereby said select states are ones which contain said one or more inserted pulses, and
  wherein said circuit for inserting one or more pulses includes key-actuated means for blocking said inserting, said inserting being enabled only upon the disabling of said means for blocking;

(b) means for establishing a preset percentage of the total states of said multistate device as select states, said preset percentage corresponding to said predetermined percentage of select outcomes;

(c) means for sensing the occurrence of said individual event and for initiating a determination making signal responsive to said event at an initiating time corresponding to said sensing;

(d) means for converting said determination making signal into a signal for stopping said cyclical accessing at the particular state being accessed at said initiating time; and (e) an indicator having means for activating a first kind of indication when said particular state is a select state.

2. A method for electronically making a random select/non-select determination for an individual event, comprising the steps of:

(a) establishing a desired, predetermined percentage of select outcomes and converting this percentage into signals for setting a corresponding percentage of the total states of a multistate electronic circuit as select states;

(b) accessing each one of the total states of said multistate circuit in a cyclical manner;

(c) sensing the occurrence of said individual event and initiating a stop signal responsive to said sensing;

(d) using said stop signal to stop said cyclical accessing at the particular state being accessed at said initiation; and (e) making a select determination when said particular state is a select state and making a non-select determination when said particular state is not a select state,
  wherein said select states are set by the application of one or more pulses applied to a first state of said multistate circuit for propagation within said multistate circuit; and
  wherein the application of said pulses is blocked under normal determining conditions and said select state setting is possible only upon disabling of said blocking.

* * * * *